(12) United States Patent
Chippendale

(10) Patent No.: US 8,567,565 B2
(45) Date of Patent: Oct. 29, 2013

(54) CHAIN LUBRICATING APPARATUS AND METHOD

(75) Inventor: David Chippendale, Blackburn (GB)

(73) Assignee: BKC Products Limited, Lancashire (GB)

( * ) Notice: Subject to any disclaimer, the term of this patent is extended or adjusted under 35 U.S.C. 154(b) by 192 days.

(21) Appl. No.: 12/712,588

(22) Filed: Feb. 25, 2010

(65) Prior Publication Data

US 2011/0203874 A1 Aug. 25, 2011

(51) Int. Cl.
*F16N 7/16* (2006.01)
*F16H 57/04* (2010.01)

(52) U.S. Cl.
USPC .............................. 184/15.1; 184/15.2; 474/91

(58) Field of Classification Search
USPC ........................... 184/15.1, 15.2, 15.3; 474/91
See application file for complete search history.

(56) References Cited

U.S. PATENT DOCUMENTS

| | | | | |
|---|---|---|---|---|
| 807,731 A | * | 12/1905 | Dodge | 474/91 |
| 2,134,490 A | * | 10/1938 | Shartle, Jr. | 474/91 |
| 3,672,468 A | * | 6/1972 | Schuster | 184/15.2 |
| 4,024,930 A | * | 5/1977 | Thomson et al. | 184/15.3 |
| 4,752,279 A | | 6/1988 | Ogino | 474/91 |
| 4,944,714 A | * | 7/1990 | Storck | 474/91 |
| 5,765,516 A | * | 6/1998 | Gruber et al. | 123/90.33 |
| 5,947,260 A | * | 9/1999 | Sorbara et al. | 198/500 |
| 6,247,555 B1 | * | 6/2001 | Millard | 184/15.1 |

FOREIGN PATENT DOCUMENTS

EP 1 065 411 A1 6/2000

* cited by examiner

*Primary Examiner* — William E Dondero
*Assistant Examiner* — Minh Truong
(74) *Attorney, Agent, or Firm* — Alix, Yale & Ristas, LLP

(57) ABSTRACT

Disclosed is a chain lubricating apparatus comprising a sprocket and a lubricant delivery means wherein, in use, the sprocket is free to rotate about an axis and comprises teeth that engage with the chain. The lubricant delivery means is configured such that lubricant is delivered to a specific part of the chain when the sprocket is in a particular angular configuration with respect to the axis.

11 Claims, 4 Drawing Sheets

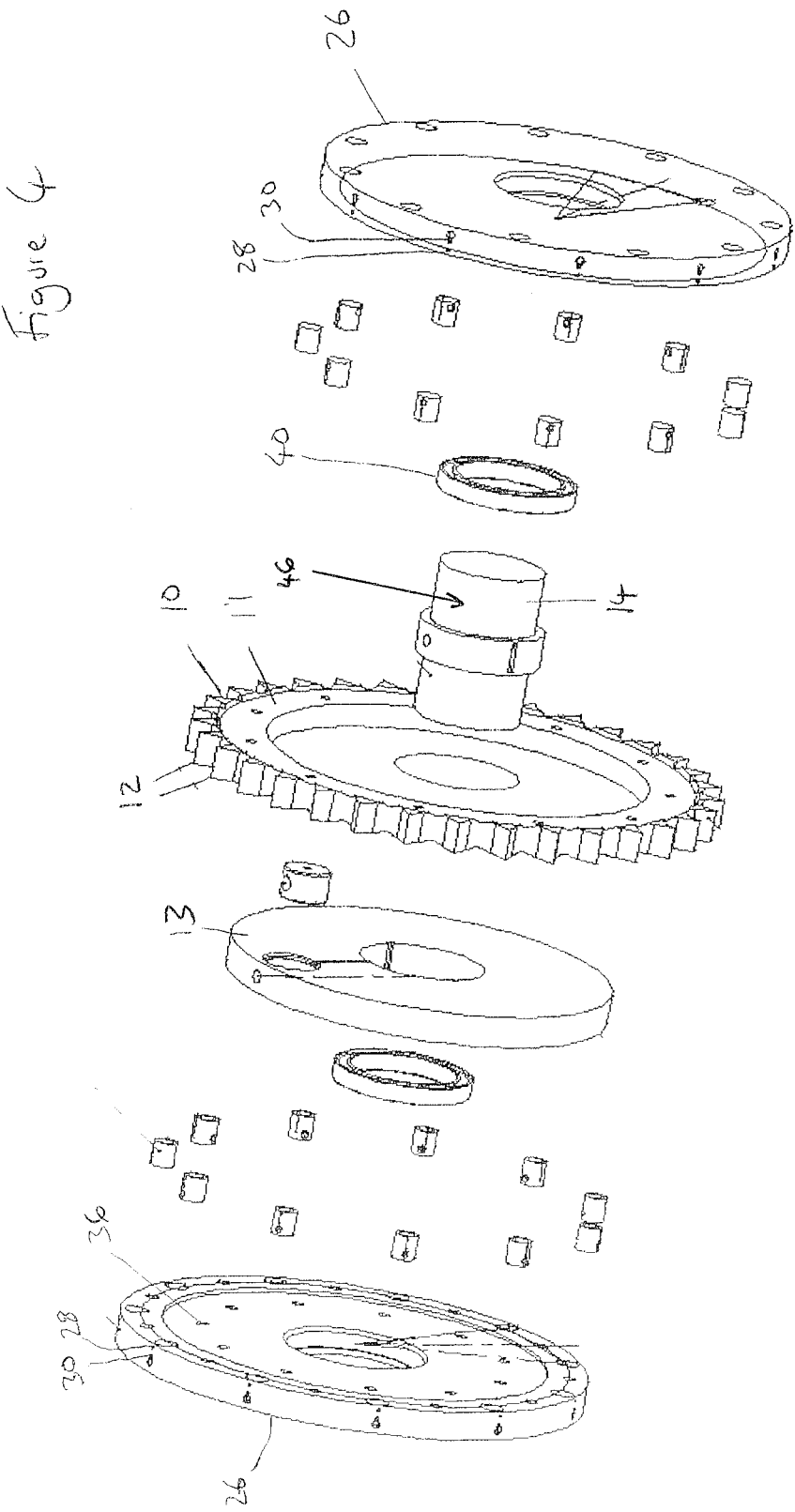

CHAIN LUBRICATING APPARATUS AND METHOD

FIELD OF THE INVENTION

The present invention relates to a chain lubricating apparatus and method.

BACKGROUND OF THE INVENTION

Chains are used throughout industry and in many mechanical devices. An inherent problem with chains arises due to the fact that chains contain moving parts and there is friction between chain sections. To reduce the damage caused by friction and to prolong the life of the chain, lubricant can be added to the chain. Established chain lubricating techniques involve running the chain through a lubricant bath or brushing lubricant onto the chain. This leads to further problems; the application can be messy, there can be contamination of the lubricant source, expensive lubricant may be used to excess and wasted, and these techniques do not target particular sections of the chain so the lubrication process is inefficient.

Embodiments of the present invention aim to address problems associated with chain lubrication, whether mentioned herein or not.

SUMMARY OF THE INVENTION

In a first aspect, the present invention provides a chain lubricating apparatus comprising a sprocket and a lubricant delivery means; wherein in use the sprocket is free to rotate about an axis and comprises teeth that engage with the chain; the lubricant delivery means is configured such that lubricant is delivered to a specific part of the chain when the sprocket is in a particular angular configuration with respect to the axis.

Suitably, the lubricant delivery means is configured whereby lubricant is delivered to the chain from the underside of the chain. Suitably, lubricant is delivered to the chain at multiple defined locations.

Suitably, the chain lubricating apparatus is configured whereby the lubricant is delivered to a specific part of the chain for a limited period of time. Suitably, the period of time is determined by an angular arc such that as the sprocket is rotated through the arc, the lubricant is delivered.

Suitably, the chain lubricating apparatus is configured whereby lubricant is delivered to a specific part of the chain when the sprocket is in one of a plurality of angular configurations.

Suitably, the chain lubricating apparatus further comprises a lubricant source. Suitably, the lubricant source is pressurised.

Suitably, the chain lubricating apparatus further comprises a lubricant return means which enables excess lubricant not delivered by the lubricant delivery means to the chain to return to the lubricant source.

Suitably, the lubricant source and the chain lubricating apparatus form a closed system for the lubricant.

Suitably, the sprocket comprises a sprocket lubricant channel. Suitably, the sprocket lubricant channel leads from an inner region of the sprocket to an outer region of the sprocket. Suitably, the sprocket lubricant channel terminates at a position in line with the particular part of the chain to be lubricated. Suitably, the sprocket lubricant channel terminates at a plurality of positions in line with the particular parts of the chain to be lubricated. Suitably, the sprocket comprises a plurality of sprocket lubricant channels.

In a different arrangement, the sprocket has a first surface and a second surface, and a disc is arranged such that its inner surface lies flush against the sprocket first surface; wherein the disc comprises a disc lubricant channel. Suitably, the disc lubricant channel leads from an inner region of the disc to an outer region of the disc. Suitably, the disc lubricant channel terminates at a position in line with the particular part of the chain to be lubricated. Suitably, the disc lubricant channel terminates at a plurality of positions in line with the particular parts of the chain to be lubricated. Suitably, the disc comprises a plurality of disc lubricant channels.

Suitably, the sprocket comprises an outer sprocket and an inner sprocket section where the inner sprocket section comprises a sprocket lubricant channel and the disc comprises a disc lubricating channel and the outer sprocket and disc are free to rotate about the axis relative to the inner sprocket section, whereby the inner sprocket section and the disc are configured such that when the sprocket lubricant channel and the disc lubricant channel are aligned, lubricant passes through the sprocket lubricant channel into the disc lubricant channel and is delivered to the chain.

Suitably, the outer sprocket and the disc are connected together.

Suitably, the sprocket lubricant channel terminates at the position where the disc lubricant channel begins. Suitably, the sprocket lubricant channel terminates at a position towards the outer region of the sprocket.

Suitably, a first disc is arranged such that its inner surface lies flush against the sprocket first surface and a second disc is arranged such that its inner surface lies flush against the sprocket second surface.

Suitably, the sprocket and the disc are configured whereby lubricant can escape from the sprocket lubricant channel or from the disc lubricant channel and form a thin layer of lubricant between the sprocket and the disc.

Suitably, the chain lubricating apparatus is configured whereby the movement of the chain causes the rotation of the sprocket about the axis.

In a different arrangement, the sprocket is mounted on a drive shaft which rotates the sprocket as the drive shaft is rotated.

Suitably, the lubricant delivery means delivers the lubricant to the chain under the force of gravity.

Suitably, the lubricant delivery means delivers the lubricant to the chain under the centrifugal force as the sprocket is rotated.

Suitably, the lubricant delivery means delivers the lubricant to the chain under pressure applied to the lubricant.

In a second aspect, the present invention provides a chain lubricating method comprising the steps: rotating a sprocket about an axis; engaging the sprocket with a chain; and delivering lubricant to a specific part of the chain when the sprocket is in a particular angular configuration with respect to the axis.

Suitably, lubricant is delivered to the underside of the chain. Suitably, lubricant is delivered to multiple defined locations.

Suitably, lubricant is delivered to a specific part of the chain for a limited period of time. Suitably, the period of time is determined by an angular arc such that as the sprocket is rotated through the arc, the lubricant is delivered.

Suitably, lubricant is delivered to a specific part of the chain when the sprocket is in one of a plurality of angular configurations.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIG. 4 shows an exploded view of an embodiment of the disclosed chain lubricating apparatus.

DESCRIPTION OF PREFERRED EMBODIMENTS

Figure 1:
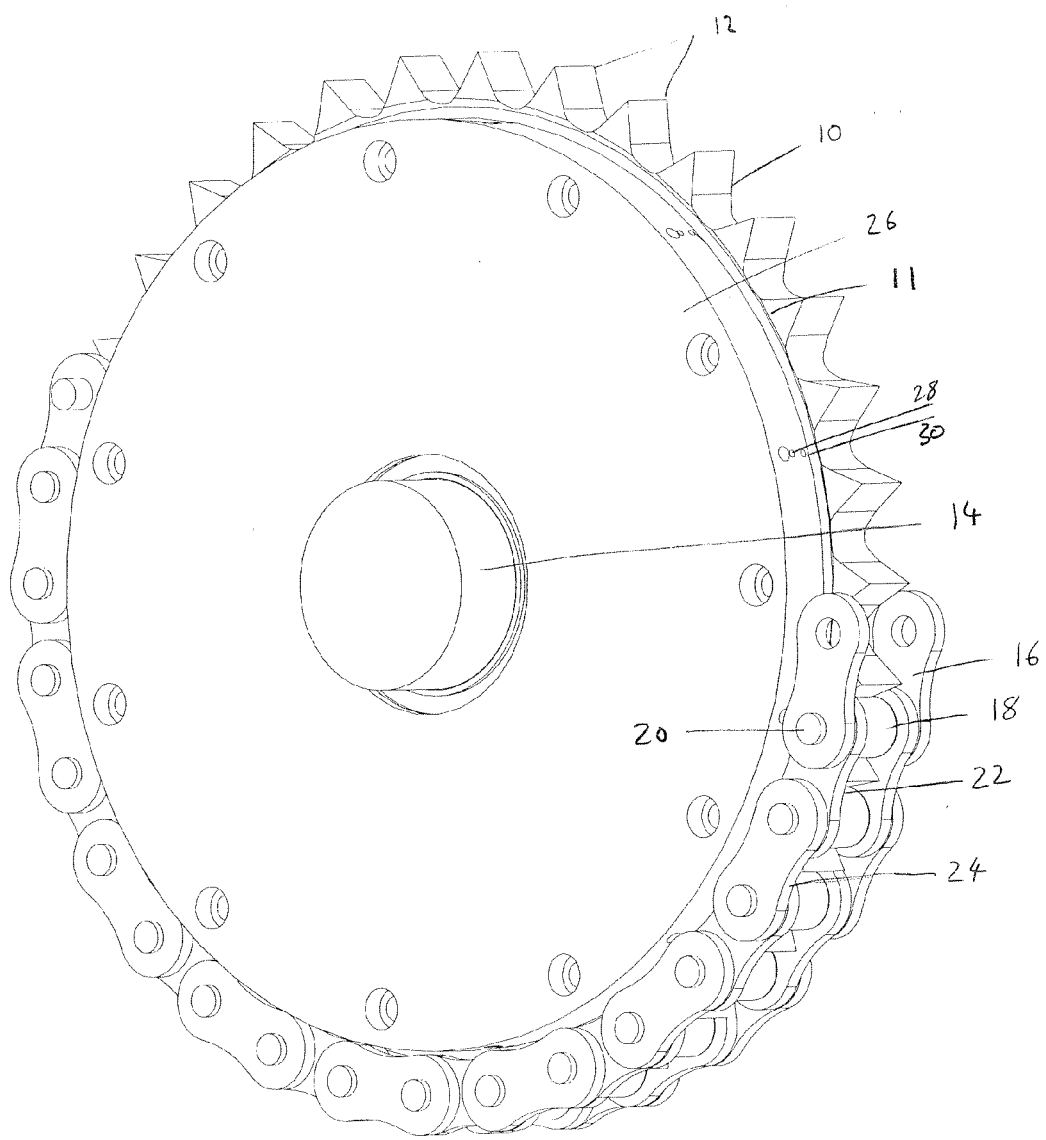
FIG. 1 shows a perspective view of one embodiment of the disclosed chain lubricating apparatus showing the sprocket and disc assembly.

Referring to FIG. 1 there is shown a chain lubricating apparatus according to an embodiment of the disclosure. The chain lubricating apparatus comprises a sprocket 10 having an outer sprocket 11, sprocket teeth 12 and an inner sprocket section 13 (shown in FIG. 2), and positioned on a shaft 14. A chain 16 is shown interlocked with the sprocket teeth 12 and comprises chain rollers 18, chain pins 20, chain inner plates 22 and chain outer plates 24. A disc 26 has disc lubricant outlets 28, 30 and is positioned on the shaft 14 next to the sprocket 10.

As discussed in more detail below, the chain 16 is positioned on the outer sprocket 11 such that the disc lubricant outlet 28 is aligned with the junction between the chain outer plate 24 and the chain inner plate 22, and the disc lubricant outlet 30 is aligned with the junction between the chain roller 18 and the chain inner plate 22. The points of greatest friction within the chain are where the chain outer plate 24 and chain inner plate 22 overlap, and where the chain roller 18 is in contact with the chain inner plate 22. Lubricant is delivered through the disc lubricant outlets 28, 30 specifically to these points of greatest friction on the underside of the chain 16. This targeted delivery of lubricant ensures that the lubricant is delivered to the chain at the required location of greatest friction. This gives a more efficient delivery means with less mess and less waste of lubricant.

Whilst FIG. 1 shows a first disc 26 on a first side of the sprocket 10, it will be appreciated that a second disc of similar construction to the first disc can also be placed on the opposite side of the sprocket 10. This second disc acts in the same way to deliver lubricant through disc lubricant outlets and target the points of greatest friction on the other side of the chain.

Figure 2:
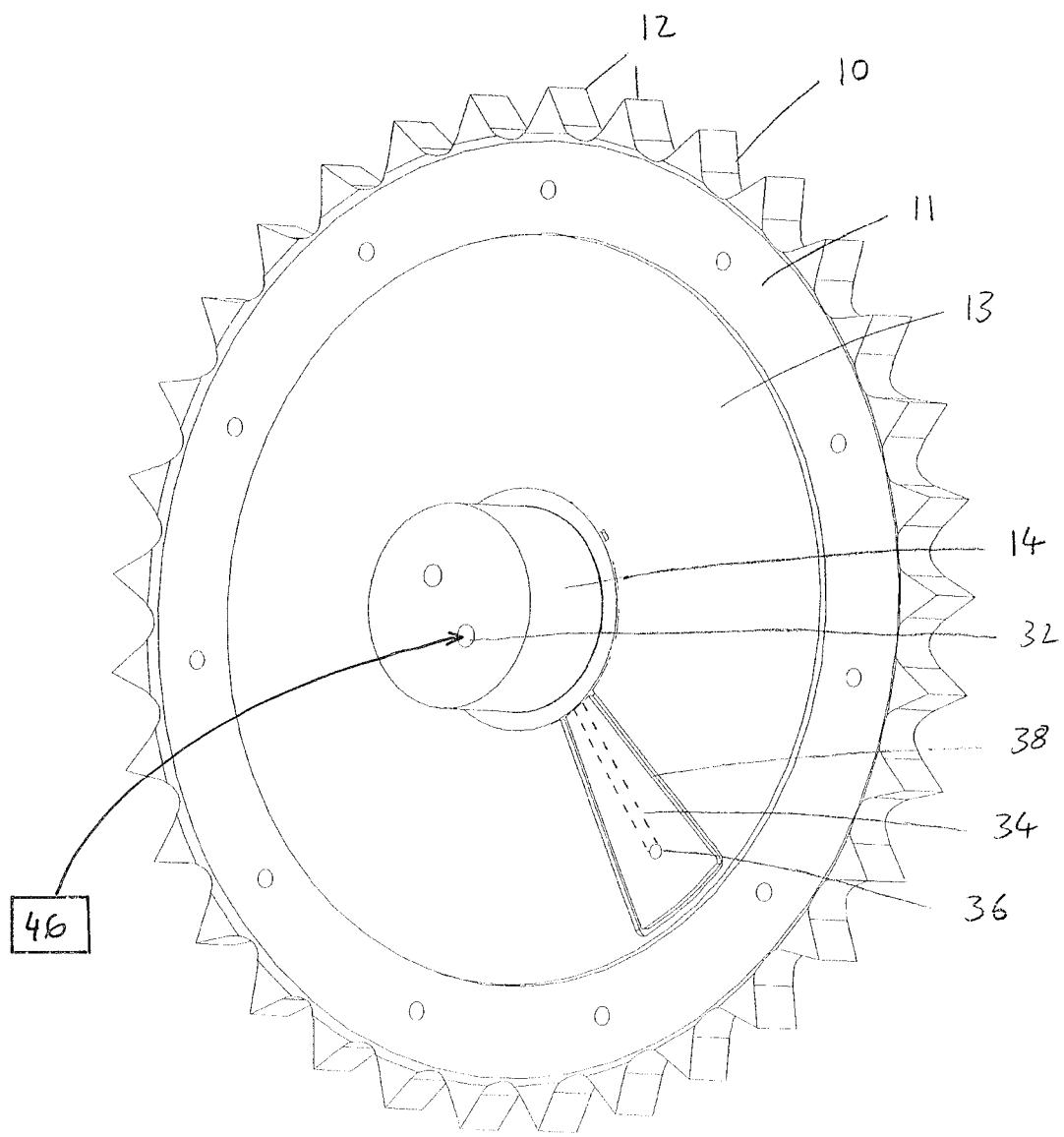
FIG. 2 shows a perspective view of the sprocket of FIG. 1.
Figure 3:
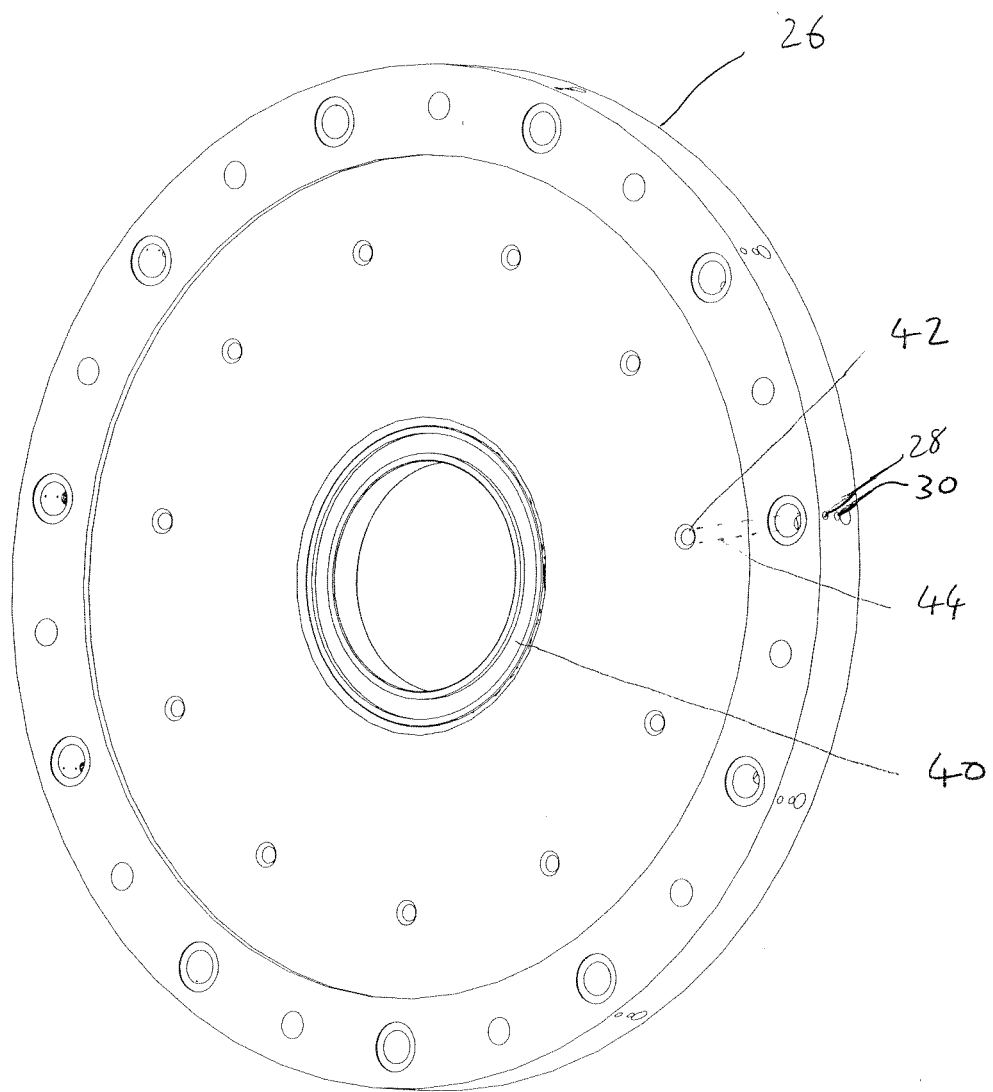
FIG. 3 shows a perspective view of the disc of FIG. 1.

Referring now to FIGS. 2 and 3 and the chain lubricating apparatus described above in relation to FIG. 1. FIG. 2 shows the sprocket 10 having outer sprocket 11 and inner sprocket section 13 positioned on the shaft 14. The shaft comprises a shaft lubricant inlet 32 which connects to a sprocket lubricant channel 34 contained within the inner sprocket section 13. The sprocket lubricant channel 34 leads to a sprocket lubricant aperture 36. The inner sprocket section 13 also comprises a lubricant return channel 38 which is an open channel in the surface of the inner sprocket section 13.

FIG. 3 shows the disc 26 comprising disc bearings 40, a disc lubricant inlet 42 which connects to a disc lubricant channel 44 and ends at the disc lubricant outlets 28, 30.

Both the sprocket 10 and the disc 26 are positioned on the shaft 14. The outer sprocket section 11 is connected to the disc 26. The inner sprocket section 13 is connected to the shaft 14. The disc bearings 40 allow the disc 26 and the outer sprocket 11 to rotate freely relative to the shaft 14 and the inner sprocket section 13. The disc 26 and the sprocket 10 are arranged such that they fit closely together with no substantial gaps therebetween. The outer sprocket 11 and disc 26 are rotated together. The inner sprocket section 13 is fixed in place and therefore there is relative rotation between the inner sprocket section 13 and the disc 26 and outer sprocket 11 combination. In operation, lubricant passes through the shaft lubricant inlet 32 into the sprocket lubricant channel 34. The disc 26 is rotated relative to the inner sprocket section 13 and at one or more defined points in the rotation cycle the sprocket lubricant aperture 36 will overlap with the disc lubricant inlet 42. During the period of overlap, lubricant can pass through the sprocket lubricant channel 34 into the disc lubricant channel 44 and onto the chain through the disc lubricant outlets 28, 30.

In this way, lubricant is only free to pass through the disc lubricant outlets 28, 30 when the disc 26 and the sprocket 10 are in a particular angular configuration. The frequency of the lubricant delivery is determined by the relative speed of rotation of the disc 26 with respect to the inner sprocket section 13. The duration of each lubricant delivery is determined by the time of overlap between the sprocket lubricant aperture 36 and the disc lubricant inlet 42. It will be appreciated that the size of the sprocket lubricant aperture 36 and the disc lubricant inlet 42 can vary to increase or decrease the duration of lubricant delivery. Also, the shape of the sprocket lubricant aperture 36 and/or the disc lubricant inlet 42 could be tapered along the direction of overlap. This would act to vary the amount of lubricant delivered so as to provide a slow delivery of lubricant on initial overlap and a quick delivery of lubricant on further overlap. Also, multiple disc lubricant inlets 42, disc lubricant channels 44 and disc lubricant outlets 28, 30 could be provided so as to provide multiple lubricant delivery means to multiple locations on the chain 16.

The lubricant is delivered from a lubricant source 46 which is under pressure. When the disc 26 and the inner sprocket section 13 are in an angular configuration such that the sprocket lubricant aperture 36 is not overlapping the disc lubricant inlet 42, lubricant will be in the sprocket lubricant channel 34 under pressure. In this state, a small amount of lubricant will pass through the sprocket lubricant aperture 36 into the space between the inner sprocket section 13 and the disc 26. This will provide a thin layer of lubricant between the disc 26 and the inner sprocket section 13 which will facilitate their relative rotation and reduce friction between the two.

Also, when the sprocket lubricant aperture 36 and disc lubricant inlet 42 are not overlapping, lubricant will remain in the disc lubricant channel 44. A lubricant return channel 38 is therefore provided such that when the disc lubricant inlet 42 overlaps the lubricant return channel 38, lubricant can pass from the disc lubricant channel 44 into the lubricant return channel 38 and back to a lubricant return reservoir.

Referring now to FIG. 4, an exploded view of the chain lubricating apparatus shows a sprocket 10 comprising an outer sprocket 11 and an inner sprocket section 13 having discs 26 on each side of the sprocket 10 so as to deliver lubricant to both sides of the chain 26 by the means already described above.

It will be appreciated that modifications may be made to the example embodiment described herein without detracting from the present invention. The sprocket and shaft may rotate freely or the shaft may be a drive shaft and drive the sprocket. Alternatively the shaft and sprocket may be held in place and the disc may rotate to provide relative rotation between the disc and the sprocket. The lubricant may be supplied under pressure and/or under the force of gravity and/or under the force of a centrifugal force. The lubricant source and the lubricant return reservoir may be different or the same. Furthermore, if they are the same, the system may comprise a closed system.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A chain lubricating apparatus for delivering lubricating fluid to a sprocket-driven chain, comprising:
    a sprocket comprising an inner sprocket section and an outer sprocket section with teeth that engage the chain, the sprocket being rotatable about an axis;
    at least one disc being positioned adjacent to and substantially coaxially with the sprocket, and configured to be rotatable about the axis;
    a lubricant source;
    a lubricant delivery means; and
    a lubricant return path;
    wherein during operation of said sprocket-driven chain, the inner sprocket section and at least one disc independently rotate about said axis relative to each other and the lubricant delivery means is configured to deliver lubricant to a predetermined part of said chain when said inner sprocket section is positioned at a predetermined angular position relative to said at least one disc around said axis and the lubricant return path allows excess lubricant that is expelled by said lubricant delivery means to return to the lubricant source when said inner sprocket section is positioned at another predetermined angular position relative to said at least one disc around said axis.

2. The chain lubricating apparatus of claim 1, wherein said chain comprises an outer side and an underside and said lubricant delivery means is configured to deliver lubricant to the chain from the underside of the chain.

3. The chain lubricating apparatus of claim 1, wherein the lubricant delivery means is configured to deliver lubricant to said chain at a plurality of predetermined locations.

4. The chain lubricating apparatus of claim 1, wherein the lubricant delivery means is configured such that delivery of lubricant to the chain during operation of said sprocket-driven chain is intermittent.

5. The chain lubricating apparatus of claim 4, wherein the duration of lubrication delivery to said chain during each intermittent delivery is determined by an angular arc around said axis such that lubricant is delivered as the sprocket rotates through said arc.

6. The chain lubricating apparatus of claim 1, wherein the lubricant delivery means is configured to deliver lubricant to a predetermined part of said chain when said inner sprocket section is in one of a plurality of angular positions.

7. The chain lubricating apparatus of claim 1, wherein the lubricant source is pressurised.

8. The chain lubricating apparatus of claim 1, wherein said lubricant source and said chain lubricating apparatus form a closed system for the lubricant.

9. The chain lubricating apparatus of claim 1, wherein the at least one disc is connected to the outer sprocket section, the at least one disc and outer sprocket section thereby being rotatable in unison independent of the inner sprocket section.

10. The chain lubricating apparatus of claim 1, comprising two discs, wherein the sprocket is positioned between the discs.

11. The chain lubricating apparatus of claim 10, wherein the inner sprocket section and each of the discs are rotatable independent of each other.

* * * * *